(No Model.)
C. E. KELLS, Jr.
ELECTRO MAGNETIC ENGINE.
No. 453,260. Patented June 2, 1891.
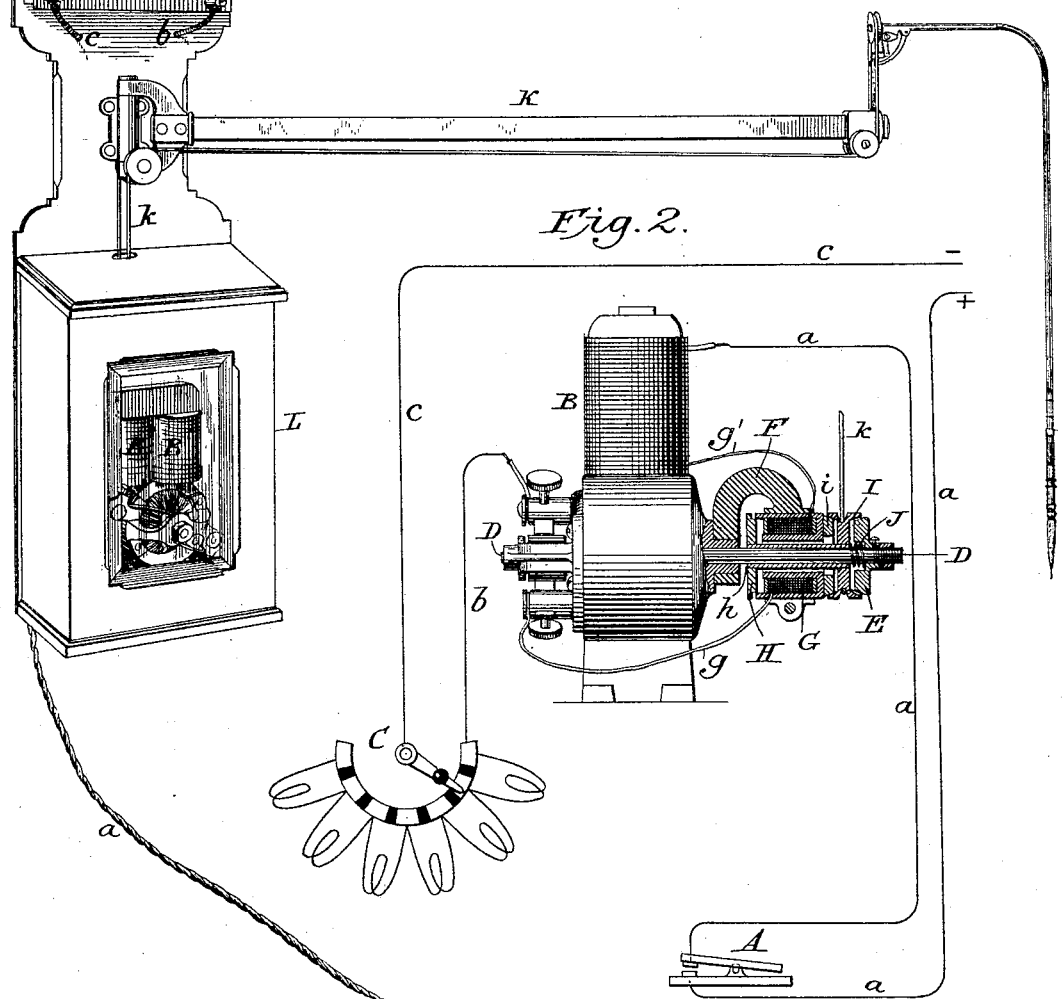

UNITED STATES PATENT OFFICE.

CHARLES EDMUND KELLS, JR., OF NEW ORLEANS, LOUISIANA.

ELECTRO-MAGNETIC ENGINE.

SPECIFICATION forming part of Letters Patent No. 453,260, dated June 2, 1891.

Application filed February 24, 1891. Serial No. 382,679. (No model.)

*To all whom it may concern:*

Be it known that I, CHARLES EDMUND KELLS, Jr., a citizen of the United States, residing at New Orleans, in the parish of Orleans and State of Louisiana, have invented certain new and useful Improvements in Electro-Magnetic Engines, of which the following is a specification.

In certain classes of apparatus—such, for instance, as dental engines—it is highly important that the operator should be able to stop and start the tool employed promptly, as well as to control its speed of rotation. An electric motor furnishes the means of quickly starting the tool, of driving it at any desired speed, and of readily disconnecting it from the motive power; but practical difficulties are encountered in stopping and starting the apparatus. If, for instance, the full current be turned on the motor at the moment of starting its windings are apt to be overheated and injured before the inertia of the mechanism is overcome, and the momentum causes the tool to revolve some time after the driving power is cut off. In order to overcome these difficulties and to adapt the apparatus to my purposes I have combined in series in an electric circuit a circuit-controlling switch, an adjustable resistance, the field-coils of an electric motor, and the coils of an electro-magnet, which latter actuates a clutch connected with the driving-wheel, as a consequence of which organization the operator is enabled to start the motor promptly and simultaneously to throw the clutch into action to operate the mechanism, and to stop such action by simply breaking the circuit, which promptly releases the driving-wheel from the clutch.

In the accompanying drawings, Figure 1 represents a diagrammatic perspective view of so much of apparatus embodying my improvements in a dental engine as is necessary to illustrate the subject-matter claimed; and Fig. 2, a diagrammatic elevation of a portion of the apparatus, partly in section.

Unless otherwise specified the parts are of well-known construction and operation.

A wire $a$ leads from a generator (not shown) through a circuit-breaking switch, shown in the form of a treadle A placed in convenient relation to the operator's foot, to the field-coils B of an electro-motor. A wire $b$ connects these coils with an adjustable resistance C, which a wire $c$ in turn connects with the other pole of the generator. The armature-shaft D of the motor projects beyond the frame and carries a friction-collar E, rigidly secured thereto, so as to revolve therewith. A bracket F projecting from the main frame carries a tubular electro-magnet G, the coils of which are connected in series with the field-coils by wires $g$ $g'$. The armature H of the tubular magnet is of a disk shape and secured upon a sleeve $h$, which plays freely endwise on the armature-shaft D inside the tubular magnet G. A driving-wheel or belt-pulley I is secured on the projecting end of this sleeve on the opposite side of the magnet from its disk-armature H. This wheel is provided with a double flange, which is normally pressed by a coiled spring J on the armature-shaft against a friction block or collar $i$, fixed on the magnet G, normally to hold the wheel from turning, while the other flange when the armature H is attracted by the magnet engages with the friction-collar E on the armature-shaft, which constitutes the clutch or driving connection. A belt or band $k$, encircling the driving-pulley I, is shown as passing around suitable pulleys on a swinging arm K to drive the flexible shaft and tool of a dental engine.

Fig. 1 shows the apparatus as mounted in a cabinet and wall-bracket L, arranged in a convenient position for the operator, the foot-treadle being connected with the motor by a cable $a$ $b$, which allows considerable change of position in the treadle, which the operator can move with his foot while standing in convenient proximity to the adjustable resistance, which he can thus reach with one hand while holding the hand-piece of the tool in the other.

The clutch shown is substantially similar to that illustrated in Fig. 1 of Letters Patent No. 443,772, granted to me December 30, 1890. That patent also illustrates other forms of clutches adaptable to my improved apparatus; but my invention is not limited to the precise details of the clutch shown, as other well-known forms of clutch would answer a good purpose in the organization.

The operation of the apparatus will readily be understood from the foregoing description. Fig. 2 shows it in its normal position when at rest, the circuit being broken and the driving-pulley I locked by the spring J against the fixed collar $i$, in which position the disk-armature is separated from its magnet G. The resistance stands in such position as preferably to allow a portion only of the current to pass when the apparatus is started, which the operator does by closing the circuit with the foot-treadle and turning on the current by the adjustable resistance until the desired speed is reached. This starts the motor promptly and energizes its coils, as well as those of the tubular magnet G, which latter attract the armature-disk H, thereby forcing the sleeve and pulley mounted thereon outward into contact with the friction-collar E, which revolves with the armature-shaft and imparts motion to the pulley, and the mechanism is driven therefrom, as above explained. When the circuit is broken, the magnets are demagnetized, and the spring J throws the driving-pulley I into contact with the friction-block $i$, which stops the mechanism. This manner of simultaneously stopping or starting the motor and driving connections possesses advantages which will readily be appreciated by those skilled in the art.

The tubular magnet G, instead of being constructed separately, as shown, might form an extension or prolongation of the field-coils by employing clutches of forms shown in my patent above mentioned.

I claim as of my own invention—

1. The combination, substantially as hereinbefore set forth, of an electric motor, a driving wheel or pulley, and an electro-magnetic clutch in series with the field-coils of the motor and with a circuit-breaker, whereby the stopping and starting of the motor and the release or engagement of the clutch coincide.

2. The combination, substantially as hereinbefore set forth, of an electric motor, a clutch carried by its armature-shaft, a driving-wheel loose on the shaft, and an electro-magnet actuating the clutch, which magnet is in series with the field-coils of the motor and with the circuit-breaker, whereby the clutching and unclutching of the driving mechanism is rendered coincident with the stopping and starting of the machine.

3. The combination, substantially as hereinbefore set forth, of an electromotor, a clutch fixed on its armature-shaft, a tubular magnet, its armature mounted on a sleeve on the shaft, a driving-pulley fast on the sleeve, a spring actuating the driving-pulley in opposition to the pull of the magnet, and a circuit-breaker in series with the field-coils and the tubular magnet.

4. The combination, substantially as hereinbefore set forth, of electrical connections, a circuit-breaker, a variable resistance, a motor, and an electro-magnet included in series therein, a driving-wheel mounted on the armature-shaft of the motor, and a clutch operated by the electro-magnet to throw the driving-wheel into or out of gear simultaneously with the stopping and starting of the motor.

5. The hereinbefore-described electro-magnetic engine, consisting of the combination of a wall bracket or casing, an electromotor, mechanism actuated thereby, an electro-magnetic clutch, and a variable resistance mounted on the bracket, a foot-treadle constituting a circuit-controlling switch, and electrical connections including the treadle, the variable resistance, the motor, and the clutch-actuating magnet in series, for the purposes specified.

In testimony whereof I have hereunto subscribed my name.

CHARLES EDMUND KELLS, JR.

Witnesses:
WM. KANES,
JNO. L. PEYTAVIN.